United States Patent
Kim et al.

(10) Patent No.: US 9,538,057 B2
(45) Date of Patent: Jan. 3, 2017

(54) METHOD AND APPARATUS FOR PHOTOGRAPHING A PANORAMIC IMAGE

(75) Inventors: Yun-Jung Kim, Seoul (KR); Sung-Dae Cho, Yongin-si (KR); Byung-Jun Son, Seoul (KR)

(73) Assignee: Samsung Electronics Co., Ltd (KR)

( * ) Notice: Subject to any disclaimer, the term of this patent is extended or adjusted under 35 U.S.C. 154(b) by 319 days.

(21) Appl. No.: 13/194,156

(22) Filed: Jul. 29, 2011

(65) Prior Publication Data

US 2012/0026283 A1    Feb. 2, 2012

(30) Foreign Application Priority Data

Jul. 30, 2010  (KR) .................. 10-2010-0074217

(51) Int. Cl.
*H04N 7/00* (2011.01)
*H04N 5/232* (2006.01)

(52) U.S. Cl.
CPC .......... *H04N 5/232* (2013.01); *H04N 5/23238* (2013.01)

(58) Field of Classification Search
USPC .............................. 348/36, E7.013
See application file for complete search history.

(56) References Cited

U.S. PATENT DOCUMENTS

| | | | |
|---|---|---|---|
| 5,510,830 A * | 4/1996 | Ohia et al. ............ | 348/36 |
| 5,548,409 A * | 8/1996 | Ohta et al. ............ | 386/242 |
| 5,689,611 A * | 11/1997 | Ohta et al. ............ | 386/224 |
| 6,377,294 B2 | 4/2002 | Toyofuku et al. | |
| 6,389,179 B1 | 5/2002 | Katayama et al. | |
| 6,396,960 B1 | 5/2002 | Yoshimura | |
| 7,594,177 B2 * | 9/2009 | Jojic et al. .................. | 715/720 |
| 7,595,833 B2 * | 9/2009 | Calisa ................ | 348/333.01 |
| 8,217,988 B2 * | 7/2012 | Park ............................. | 348/36 |
| 2002/0167537 A1 | 11/2002 | Trajkovic | |
| 2005/0270385 A1 | 12/2005 | Shioya et al. | |
| 2006/0034374 A1 * | 2/2006 | Park ..................... | G06T 7/20 375/240.16 |
| 2006/0034529 A1 * | 2/2006 | Park ................... | H04N 19/563 382/236 |
| 2006/0088191 A1 | 4/2006 | Zhang et al. | |
| 2007/0095588 A1 | 5/2007 | Mattes et al. | |
| 2007/0253698 A1 | 11/2007 | Park et al. | |
| 2007/0269198 A1 | 11/2007 | Park et al. | |
| 2008/0106593 A1 * | 5/2008 | Arfvidsson et al. ........... | 348/39 |
| 2008/0211902 A1 | 9/2008 | Ayaki | |

(Continued)

FOREIGN PATENT DOCUMENTS

| | | |
|---|---|---|
| CN | 101377615 | 3/2009 |
| CN | 100538743 | 9/2009 |

(Continued)

OTHER PUBLICATIONS

Chinese Office Action dated Jul. 16, 2015 issued in counterpart application No. 201110218912.2, 16 pages.

*Primary Examiner* — Christopher S Kelley
*Assistant Examiner* — Asmamaw G Tarko
(74) *Attorney, Agent, or Firm* — The Farrell Law Firm, P.C.

(57) ABSTRACT

A method and apparatus for photographing a panoramic image. The method includes detecting a Motion Vector (MV) of a plurality of images captured through a photographing unit, selecting regions to be included in the panoramic image from the plurality of images, based on the MV, and generating the panoramic image including the selected regions.

14 Claims, 9 Drawing Sheets

(56) References Cited

U.S. PATENT DOCUMENTS

| | | | |
|---|---|---|---|
| 2008/0252717 A1 | 10/2008 | Moon et al. | |
| 2009/0058990 A1* | 3/2009 | Kim | G03B 37/04 348/36 |
| 2009/0058991 A1* | 3/2009 | Kim et al. | 348/37 |
| 2009/0153685 A1* | 6/2009 | Son | H04N 5/232 348/208.99 |
| 2009/0208062 A1 | 8/2009 | Sorek et al. | |
| 2009/0257680 A1* | 10/2009 | Dhand et al. | 382/284 |
| 2010/0054628 A1* | 3/2010 | Levy et al. | 382/284 |
| 2010/0302347 A1* | 12/2010 | Shikata | 348/36 |
| 2011/0096144 A1* | 4/2011 | Pea et al. | 348/36 |
| 2011/0181688 A1* | 7/2011 | Miyamoto et al. | 348/36 |
| 2011/0249146 A1* | 10/2011 | Ishida | H04N 5/23238 348/231.99 |
| 2012/0026283 A1* | 2/2012 | Kim | H04N 5/23238 348/36 |
| 2012/0194506 A1* | 8/2012 | Passmore | G06T 15/00 345/419 |
| 2012/0212574 A1* | 8/2012 | Blumenfeld | 348/36 |
| 2013/0033568 A1* | 2/2013 | Kim et al. | 348/36 |
| 2013/0135429 A1* | 5/2013 | Lablans | 348/36 |

FOREIGN PATENT DOCUMENTS

| | | |
|---|---|---|
| EP | 0 592 136 | 4/1994 |
| KR | 1020070105108 | 10/2007 |
| KR | 1020070111269 | 11/2007 |
| KR | 1020080007849 | 1/2008 |
| KR | 1020080092578 | 10/2008 |
| KR | 1020090021527 | 3/2009 |
| KR | 1020090022054 | 3/2009 |
| KR | 1020090065914 | 6/2009 |
| WO | WO 2010/025309 | 3/2010 |

* cited by examiner

METHOD AND APPARATUS FOR PHOTOGRAPHING A PANORAMIC IMAGE

PRIORITY

This application claims priority under 35 U.S.C. §119(a) to a Korean Patent Application filed in the Korean Intellectual Property Office on Jul. 30, 2010 and assigned Serial No. 10-2010-0074217, the entire disclosure of which is hereby incorporated by reference.

BACKGROUND OF THE INVENTION

1. Field of the Invention

The present invention relates generally to a method and apparatus for photographing a digital image, and more particularly, to a method and apparatus for photographing a panoramic image.

2. Description of the Related Art

Generally, a digital camera acquires an image of a scene formed in a focal distance of a lens. The acquired image exists within the range of the angle of view (in a general camera, about 30 to 50 degrees), which is narrower than the range of the viewing angle of a person looking at the same scene with their eyes, i.e., about 150 to 200 degrees. Thus, in order for a camera to produce a picture having an angle of view similar to or larger than that of the viewing angle of a person, several images are captured by changing a capturing angle and are then sequentially interconnected to create a single image. This is commonly referred to as a panoramic photographing scheme.

Conventionally, in a panorama photographing mode, a digital camera photographs several images such that they are continued in a horizontal or vertical direction, and stores the photographed images in a memory. The images stored in the memory are then provided to internal/external image processors to connect (or combine) them into a single image. To remove color differences and image discords occurring in boundaries of each of the images, the images are often captured to overlap each other at their boundaries. Therefore, when these images are processed into a single image, the overlapping portions are aligned, stitched, and/or blended, resulting in a single image in which the individual images are smoothly connected.

A key factor for panoramic image photographing is to photograph each of images in a manner that they are aligned as accurately as possible with each other. Often, a user performs photographing in a manual fashion by mounting a camera to an auxiliary apparatus such as a tripod, and the mounted camera is rotated for photographing of each image in panoramic image photographing. However, this panoramic image photographing task is somewhat complex and requires more proficiency in a user's manipulation of the camera, when compared to basic single picture photographing Consequently, there is a need for a more convenient manipulation and efficient panoramic photographing scheme.

Further, when an image is acquired by rotating a camera in a horizontal or vertical direction, the camera transforms a real image of a first object or a second object, which is in a three-dimensional (3D) form into a first image or a second image. When a panoramic image is implemented by combining these images, distortion occurs in perspective terms, such that overlapping portions of different images are difficult to estimate. As a result, a natural panoramic image cannot be formed. Therefore, there is a need for a panoramic photographing scheme, which generates a more accurate panoramic image by matching captured portions of the same region to each other in a plurality of images captured by the camera.

SUMMARY OF THE INVENTION

Accordingly, the present invention is designed to address at least some the aforementioned limitations and problems in the prior art and to provide at least the advantages described below.

An aspect of the present invention is to provide a method and apparatus for more accurately photographing a panoramic image by estimating motion of a camera without a using a separate device or hardware.

Another aspect of the present invention is to provide a method and apparatus for more accurately photographing a panoramic image by estimating motion of a camera, without applying a projection scheme to an image input to the camera.

Another aspect of the present invention is to provide a method and apparatus for photographing a panoramic image, wherein a camera captures and processes individual images into a panoramic image, such that the photographed panoramic image can be checked immediately after the photographing, without separate post-processing of the photographed panoramic image.

According to an aspect of the present invention, a method for photographing a panoramic image is provided. The method includes detecting a Motion Vector (MV) of a plurality of images captured through a photographing unit; selecting regions to be included in the panoramic image from the plurality of images, based on the MV; and generating the panoramic image including the selected regions.

According to another aspect of the present invention, an apparatus for photographing a panoramic image is provided. The apparatus includes a Motion Vector (MV) detector for detecting an MV of a plurality of images captured through a photographing unit; a region detector for selecting regions to be included in the panoramic image from the plurality of images, based on the MV; and a panoramic image generator for generating the panoramic image including the selected regions.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described in detail with reference to the accompanying drawings. In the following description, specific items such as detailed components are described, and it is apparent to those of ordinary skill in the art that those specific items are provided only for overall understanding of the present invention and predetermined changes or modifications can be made without departing from the scope of the present invention.

Figure 1:
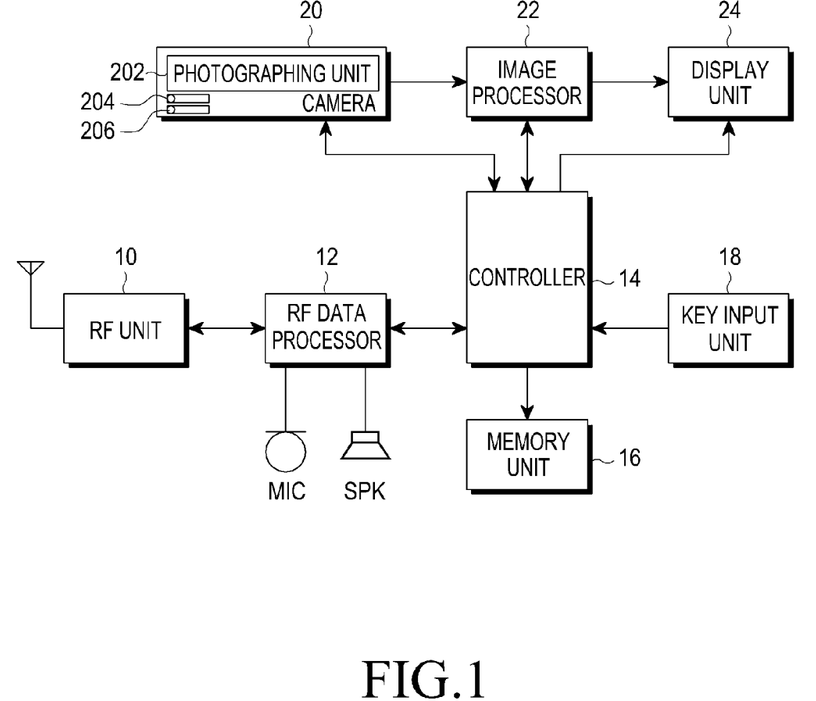
FIG. 1 is a block diagram illustrating a portable terminal to which the present invention is applied.

FIG. 1 is a block diagram illustrating a portable terminal to which the present invention is applied.

Referring to FIG. 1, a portable terminal including a digital camera function, to which the present invention is applied, includes a camera 20, an image processor 22, a display unit 24, a controller 14, a memory unit 16, and a key input unit 18.

The camera 20 performs general digital camera functions under control of the controller 14 to capture a visible light input from an external photographing object, i.e., take a picture. The camera 20 includes a photographing unit 202, for example, a Charge Coupled Device (CCD) imaging element or a Complementary Metal-Oxide Semiconductor (CMOS) imaging element, and may further include an illuminance sensor 204 for illuminance measurement and a distance sensor 206 for measuring a focal length respective to an object. The image processor 22 processes image data output from the camera 20 and converts the image data into a proper digital image data format.

The key input unit 18 includes function keys for setting various functions and outputs key input signals to the controller 14. The display unit 24 includes, for example, a display device such as a Liquid Crystal Display (LCD), and displays digital image data obtained by photographing.

The controller 14 controls the overall operation of the portable terminal in such a manner that the operation of each function unit is integrally controlled. That is, the controller 14 performs processing according to a menu selection signal input through the key input unit 18, receives an external photographing signal through the camera 20, performs processing according to the external photographing signal, and outputs an image output signal necessary for various operations, including a camera photographing image, through the display unit 24. The controller 14 may get data stored in the memory unit 16 for an output or store the data in the memory unit 16. The memory unit 16 stores a plurality of programs and data in relation to the operation of the controller 14, and also stores both information for use of the portable terminal and camera photographing image information.

The portable terminal structured as described above performs general camera functions, and in addition to the above-described functions, the controller 14 also performs a panoramic image photographing operation according to an embodiment of the present invention. Specifically, the memory unit 16 stores operation programs and related information for the panoramic image photographing operation performed in the controller 14, and outputs corresponding information to the controller 14.

For example, the portable terminal may be a mobile communication terminal. To this end, the portable terminal further includes a Radio Frequency (RF) unit 10 and an RF data processor 12 for signal processing.

When a panoramic image photographing operation is performed, the portable terminal receives the image of an object, similar to a moving image, in real-time, and when the portable terminal is moved by a user according to a panoramic image photographing direction (or moved by a separate device which has mounted the portable terminal thereon to automatically rotate the portable terminal), a currently input image and a previously captured image are compared to acquire movement information of the portable terminal and check a movement direction and a movement degree, and then the portable terminal performs acquires sequential images for generating a panoramic image.

Figure 2:
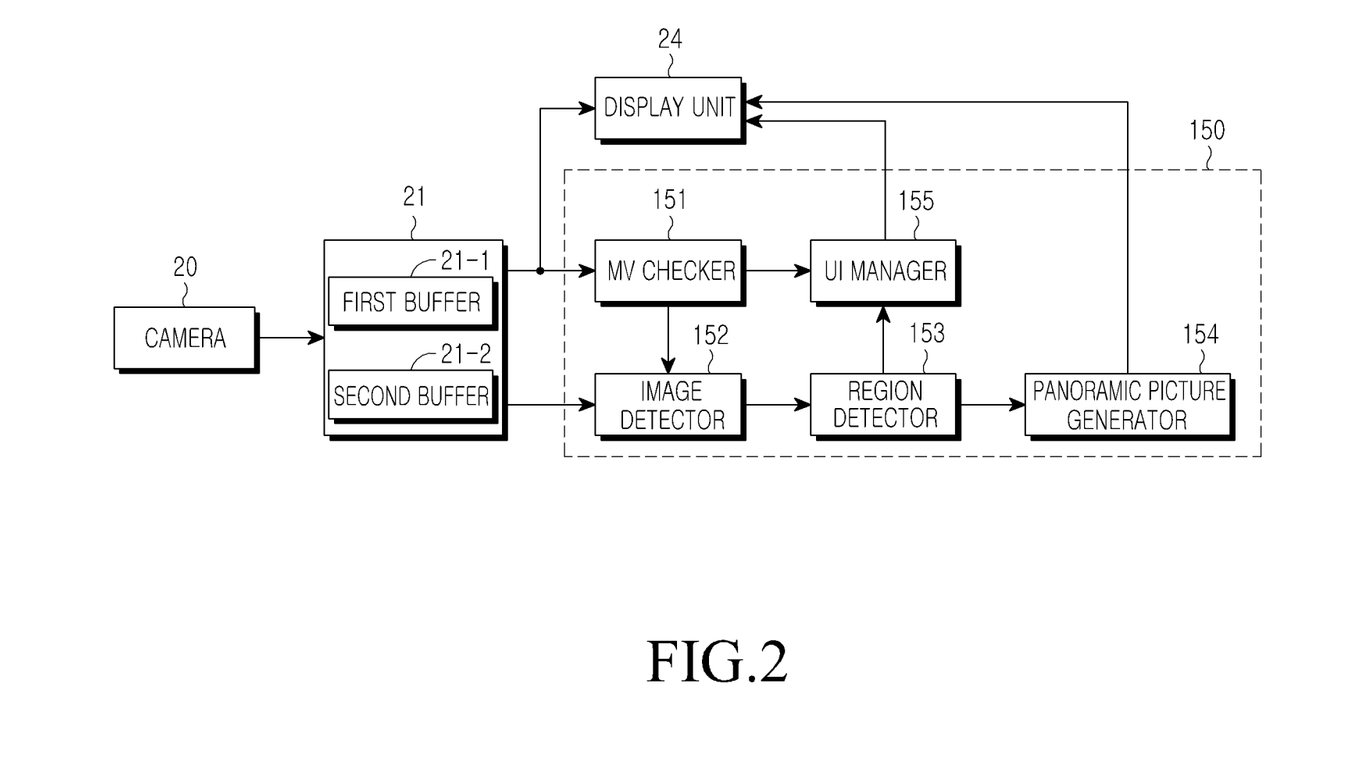
FIG. 2 is a block diagram illustrating an apparatus for photographing a panoramic image according to an embodiment of the present invention.

FIG. 2 is a block diagram illustrating a panoramic image photographing apparatus according to an embodiment of the present invention.

Referring to FIG. 2, the panoramic image photographing apparatus included in the portable terminal includes some components of the portable terminal illustrated in FIG. 1, i.e., the camera 20 and the display unit 24. Additionally, the panoramic image photographing apparatus includes a panoramic image processor 150, which includes a Motion Vector (MV) checker 151, an image detector 152, a region detector 153, and a panoramic image generator 154. The panoramic image processor 150 may be provided in the controller 14 or the image processor 22.

The camera 20, specifically, the photographing unit 202 captures an images in real-time at predetermined units of time (e.g., every $\frac{1}{30}$ seconds), and outputs the captured images to a buffer unit 21. The buffer unit 21 includes at least two first and second buffers 21-1 and 21-2. Thus, the buffer unit 21 alternately stores the images, which are captured in real-time and output from the photographing unit 20. For example, the buffer unit 21 stores a first captured image in the first buffer 21-1, stores a next image captured after a predetermined time in the second buffer 21-2, and stores a next image captured after another predetermined time in the first buffer 21-1.

The MV checker 151 generates a low-resolution image having a lower resolution than an image stored in the buffer unit 21 to detect an MV between input images. For example, the image stored in the buffer unit 21 may have a resolution of 1024×768, and the low-resolution image may have a resolution of 320×240. Moreover, the low-resolution image is a preview image provided through the display unit 24, and may be set to have the same resolution as the display unit 24.

The MV checker 151 estimates an MV between the current image having a low resolution and a previous image. For example, the MV checker 151 estimates an MV by using an average value of an optical flow or using block-matching.

The MV checker 151 may determine an MV in a high-resolution image by applying an MV checked using the low-resolution image to the high-resolution image. The MV may include both a vertical MV and a horizontal MV.

The image detector 152 may use all images input to the photographing apparatus as images to be included a panoramic image, but there may be a plurality of images captured for the same scene according to a user's moving speed. Therefore, it is desirable to use images moving a predetermined distance among all the input images as images in a panoramic image. Accordingly, the image detector 152 accumulates an MV checked in the MV checker 151 on a local motion value to determine whether an input image has moved the predetermined distance. To determine whether an input image has moved the predetermined distance, the image detector 152 determines whether the local motion value reaches a predetermined threshold value. The image detector 152 determines that the input image has moved the predetermined distance and determines the input image as an image to be included the panoramic image, if the local motion value reaches the predetermined threshold value. If the local motion value does not reach the predetermined threshold value, the image detector 152 determines that the input image has not moved the predetermined distance.

When the local motion value reaches the predetermined threshold value, the image detector 152 determines that the input image has moved the predetermined distance and determines the input image as an image constituting a panoramic image. However, the local motion value may be a value acquired by movement in a direction different from that of the panoramic image, and thus, the image detector 152 checks if the direction of local motion is the same as that of the panoramic image.

Specifically, the image detector 152 checks if the direction of the panoramic image has been determined. For example, the direction of the panoramic image may be checked from an accumulated value of an MV. That is, once photographing of the panoramic image starts, a global motion value for setting the direction of the panoramic image is initialized and the local motion value of an image to be included in the panoramic image is accumulatively added to the global motion value. When the global motion value reaches a predetermined threshold value, the image detector 152 may determine that the direction of the panoramic image has been set.

The image detector 152 also checks if the direction of local motion of the image is the same as that of the panoramic image. If the direction of local motion is of the same as the panoramic image, the image detector 152 determines the image for inclusion in the panoramic image. However, if the direction of local motion is different than that of the panoramic image, the image detector 152 does not include image in the panoramic image.

The region detector 153 sets a reference line (e.g., a central line in a horizontal or vertical direction of the image) and sets predetermined regions based on the reference line, to detect a region to be reflected to the panoramic image.

The predetermined regions detected by the region detector 153 are provided to a panoramic image generator 154, which then generates a single panoramic image by connecting the predetermined regions. The panoramic image generator 154 preferably performs image processing such as aligning, stitching, and blending to naturally connect the predetermined regions included in multiple images.

In accordance with an embodiment of the present invention, a resolution of an image used to check camera's movement and a resolution of an image included in a panoramic image are set differently, and the MV checker 151 generates a low-resolution image used to check camera's movement. In addition, the MV is checked using the low-resolution image, and the MV checked using the low-resolution image is matched to an MV of a high-resolution image to check a size of an actual MV. However, the present invention is not limited to the above examples.

For example, the MV checker 151 may check the MV from an image provided from the camera 20, without generating the low-resolution image used to check camera's movement. The camera 20 may provide the low-resolution image, check the MV from the low-resolution image, and generate the panoramic image with the low-resolution image.

Figure 3A:
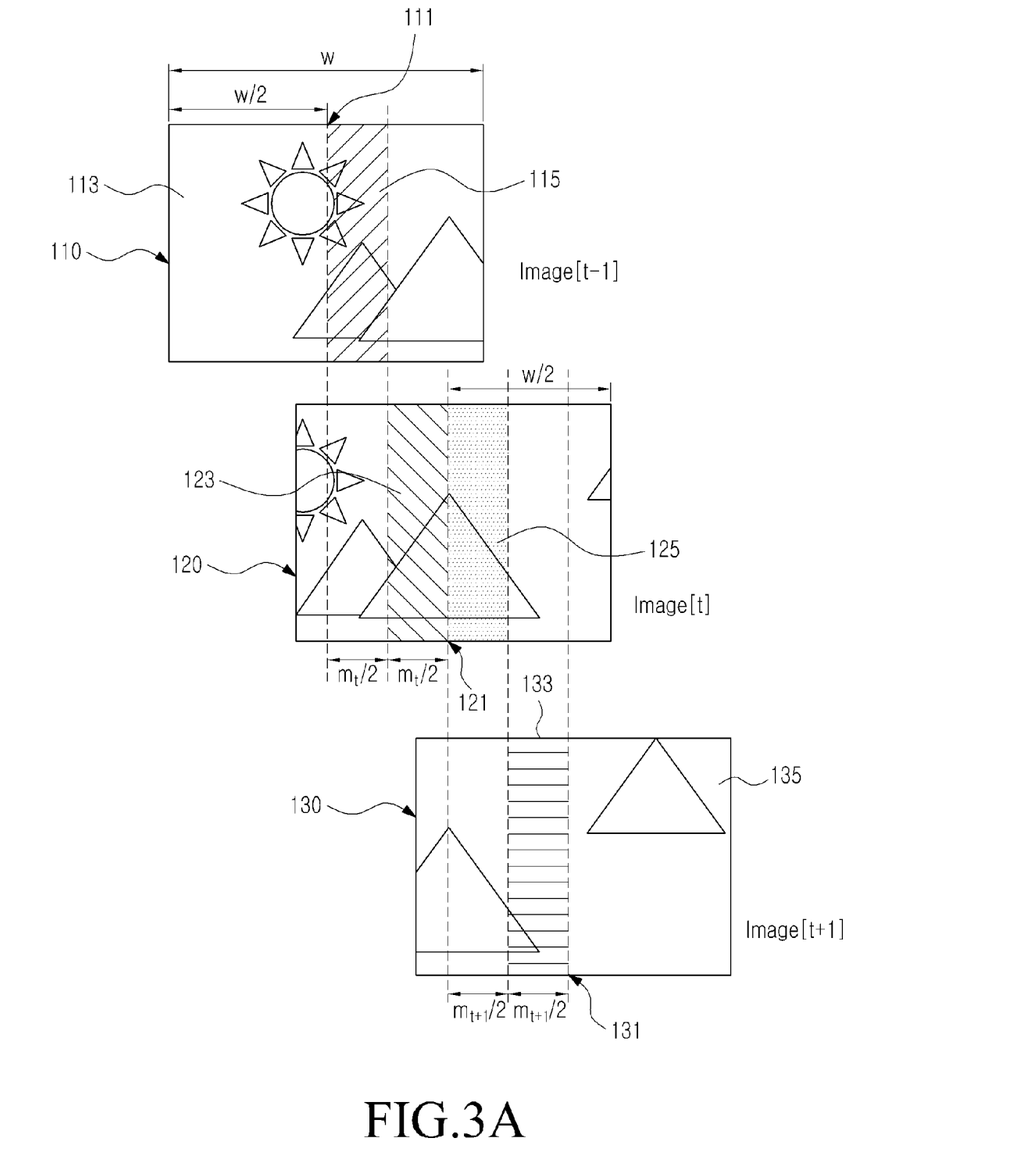
FIG. 3A illustrates regions detected by a panoramic image photographing apparatus according to an embodiment of the present invention.

FIG. 3A illustrates regions detected by the panoramic image photographing apparatus according to an embodiment of the present invention.

Figure 3B:
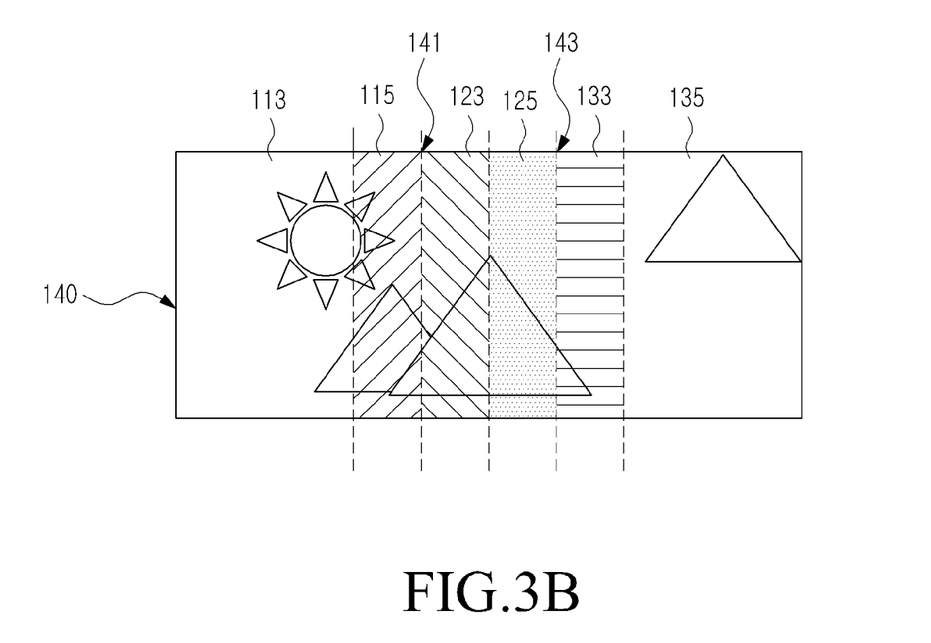
FIG. 3B illustrates a panoramic image generated by combining regions of FIG. 3A, according to an embodiment of the present invention.

Referring to FIG. 3, as panoramic image photographing is performed from the left to the right, a first image 110, a second image 120, and a third image 130 are sequentially captured. FIG. 3B illustrates a panoramic image generated by combining the regions of FIG. 3A.

More specifically, a first central line 111 is set as a reference line of the first image 110, and a second central line 121 is set as a reference line of the second image 120. As the first image 110 is an initial image for the panoramic image, the region detector 153 sets a left region with respect to the first central line 111 in the first image 110 as a first region 113 of the panoramic image. The region detector 153 also checks a movement distance $m_t$ between the first central line 111 and the second central line 121, and halves the movement distance $m_t$. The region detector 153 sets a region, which is located to the right from the first central line 111 and extends the halved movement distance $m_t/2$ from the first central line 111, as a second region 115 of the panoramic image. The region detector 153 sets a region, which is located to the left from the second central line 121 and extends the halved movement distance $m_t/2$ from the second central line 121 as a third region 123 of the panoramic image.

The region detector 153, after setting a third central line 131 as a reference line of the third image 130, checks a movement distance $m_{t+1}$ between the second central line 121 and halves the movement distance $m_{t+1}$. Like when the second region 115 and the third region 123 of the panoramic image are set, the region detector 153 sets a region, which is located to the right with respect to the second central line 121 and extends the halved movement distance $m_{t+1}/2$ from the second central line 121, as a fourth region 125 of the panoramic image, and sets a region, which is located to the left with respect to the third central line 131 and extends the halved movement distance $m_{t+1}/2$ from the third central line 131, as a fifth region 133 of the panoramic image. As the third image 130 is a last image of the panoramic image, the region detector 153 sets a left region with respect to the third central line 131 in the third image 130 as a sixth region 135 of the panoramic image.

The first through sixth regions 113, 115, 123, 125, 133, and 135 detected by the region detector 153 are sequentially provided to the panoramic image generator 154. Thus, the panoramic image generator 154 sequentially arranges the first through sixth regions 113, 115, 123, 125, 133, and 135 from the left to the right based on the direction of the MV provided by the MV checker 151, thereby generating a horizontal panoramic image 140, as illustrated in FIG. 3B. In addition, because regions included in a panoramic image have been detected from a plurality of different images, image distortion may occur at boundaries between the detected regions, i.e., a first boundary 141 between the second region 115 and the third region 123 and a second boundary 143 between the fourth region 125 and the fifth region 133. To remove image distortion, the panoramic image generator 154 may perform image processing, such as blending, on a boundary between regions detected from different images.

Although FIGS. 3A and 3B illustrate a panoramic image generated from three different images, the present invention is not limited thereto and the number of images included in the panoramic image may change.

In the above-described embodiment of the present invention, to generate the panoramic image, the left region with respect to the first central line 111 in the initial image is set as the first region 113 of the panoramic image and the right region with respect to the third central line 131 in the final image is set as the sixth region 135 of the panoramic image. The second region 115 predetermined with respect to the first central line 111 in the first image 110 is set; the third region 123 and the fourth region 125 predetermined with respect to the second central line 121 in the second image 120 are set; and the fifth region 133 predetermined with respect to the third central line 131 in the third image 130 is set. Accordingly, the panoramic image is implemented by using a central region of an image, which has small distortion in perspective terms, thereby simply minimizing distortion caused by perspective in the panoramic image without projecting an input image onto a virtual plane having the same local length. However, the first region 113 of the initial image and the sixth region 135 of the final image may have larger distortion than the second through fifth regions 115, 123, 125, and 133 provided in the vicinity of the central lines of the images. Consequently, for the panoramic image, it is desirable to combine the regions provided in the vicinity of the central lines of the images.

To generate the panoramic image by combining the regions provided in the vicinity of the central lines of the images, a User Interface (UI) displaying the regions included in the panoramic image may be provided to a user.

Further, the panoramic image photographing apparatus further includes an UI manager 155 for providing the UI.

The UI manager 155 provides the regions detected by the region detector 153, which are to be included in the panoramic image. The UI manager 155 is provided with a photographing direction of the panoramic image from the image detector 152, and outputs the UI, which displays the photographing direction, through the display unit 24.

Figure 4:
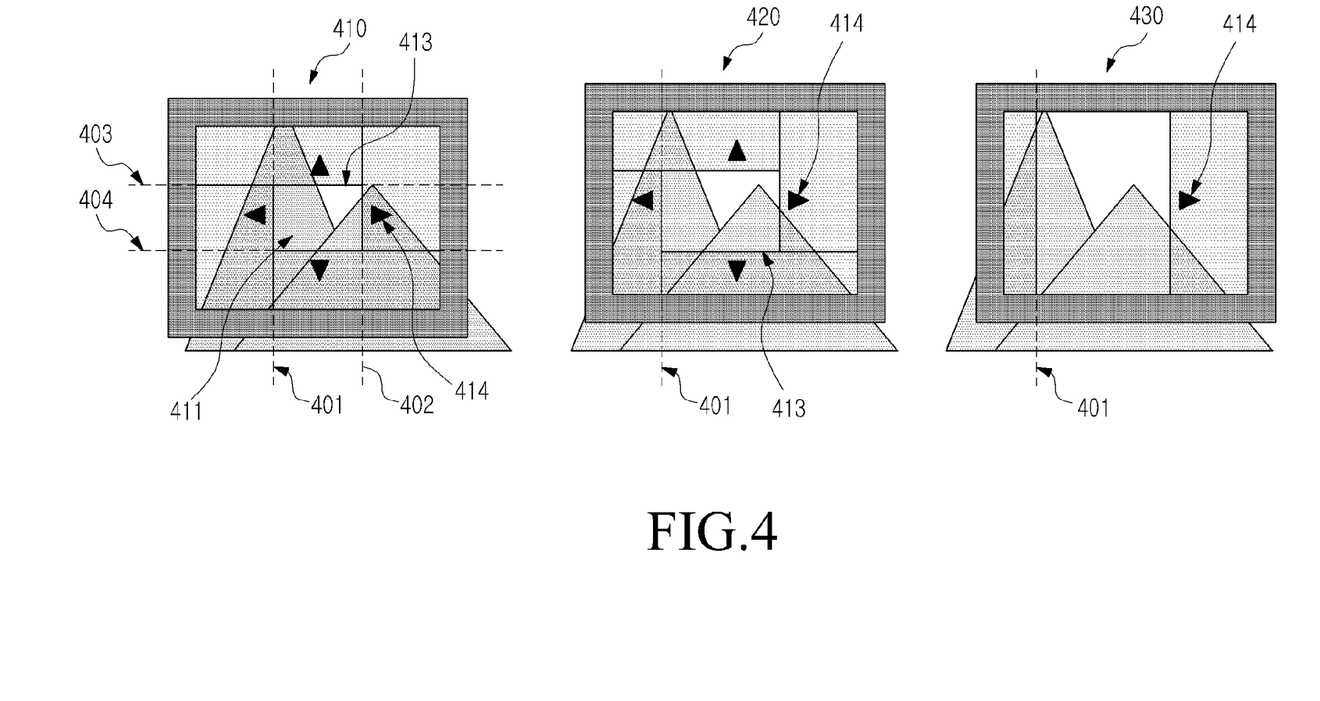
FIG. 4 illustrates a User Interface (UI) of a panoramic image photographing apparatus according to an embodiment of the present invention.

FIG. 4 illustrates a UI of a panoramic image photographing apparatus according to an embodiment of the present invention.

Once photographing of a panoramic image starts, an image 411 input through the camera 20 is displayed through the display unit 24. The UI manager 155 outputs a UI for direction selection, together with the image 411, as illustrated in a first screen 410 of FIG. 4. The UI manager 155 configures the UI for direction selection, which includes a window 413 having a predetermined size around a central region of the image 411 and a direction indicator 414 indicating a photographing direction of the panoramic image. The UI manager 155 sets a reference line for configuring the panoramic image with respect to each side of the window 413.

More specifically, when the photographing direction of the panoramic image is a right-horizontal direction, a first reference line 401, which extends from a left side of the window 413, is used as the reference line for the panoramic image. Similarly, for a left-horizontal photographing direction, a second reference line 402, which extends from a right side of the window 413, is used as the reference line for the panoramic image. Likewise, when photographing of the panoramic image is performed in a downward-vertical direction, a third reference line 403, which extends from a top side of the window 413, is used as the reference line for the panoramic image. Similarly, for an upward-vertical photographing direction, a fourth reference line 404, which extends from a bottom side of the window 413, is used as the reference line for the panoramic image.

As photographing of the panoramic image starts, for example, when the photographing apparatus is moved after reception of user input of a panorama photographing button, the UI manager 155 gradually enlarges and displays the window 143 in the moving direction of the photographing apparatus, by using an MV provided from the image detector 152, as illustrated in a second screen 420. When the MV reaches a predetermined threshold value for checking the moving direction of the photographing apparatus, the image detector 152 determines the photographing direction of the panoramic image, and the UI manager 155 receives the determined photographing direction of the panoramic image from the image detector 152. Thus, the UI manager 155 outputs the UI, which includes the first reference line 401 serving as the reference line for the panoramic image, and the direction indicator 414 indicating the photographing direction through the display unit 24, as illustrated in a third screen 430.

The panoramic image photographing apparatus may also generate the panoramic image as a 3D image, which includes a left-view image and a right-view image. The region detector 153 sets two reference lines for generating the left-view image and the right-view image in an image input through the image detector 152, and detects predetermined regions from the two reference lines. The region detector 153 then provides the two regions for generating the left-view image and the right-view image from the single image to the panoramic image generator 154. The panoramic image generator 154 generates and outputs the left-view image and the right-view image for a panoramic image by arranging and combining the regions.

Figure 5:
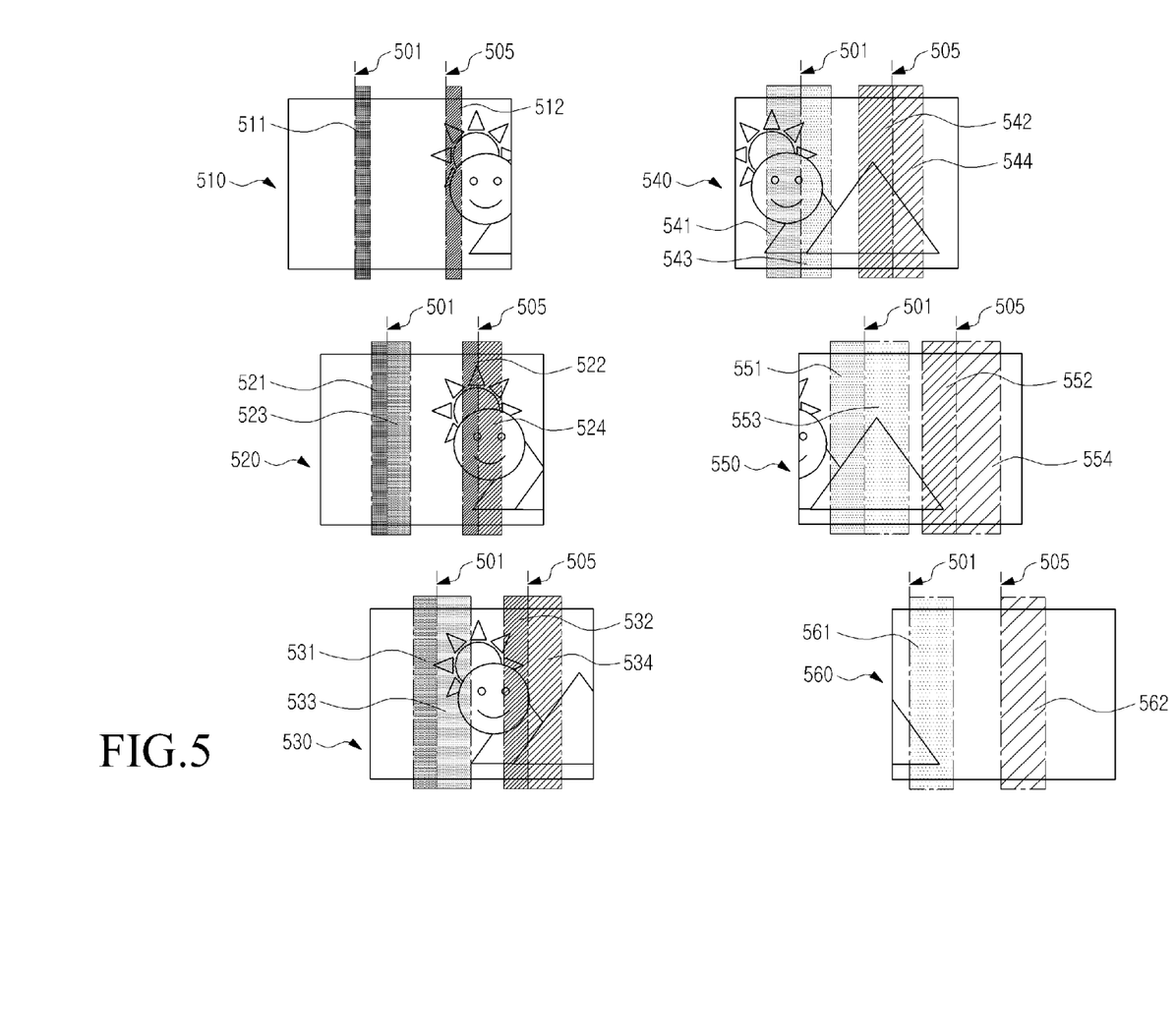
FIG. 5 illustrates regions detected by a panoramic image photographing apparatus according to an embodiment of the present invention.

FIG. 5 illustrates regions detected by a panoramic image photographing apparatus according to an embodiment of the present invention.

Referring to FIG. 5, as photographing of a panoramic image is performed from the left to the right, a first image 510, a second image 520, a third image 530, a fourth image 540, a fifth image 550, and a sixth image 560 are sequentially acquired.

Figure 6:
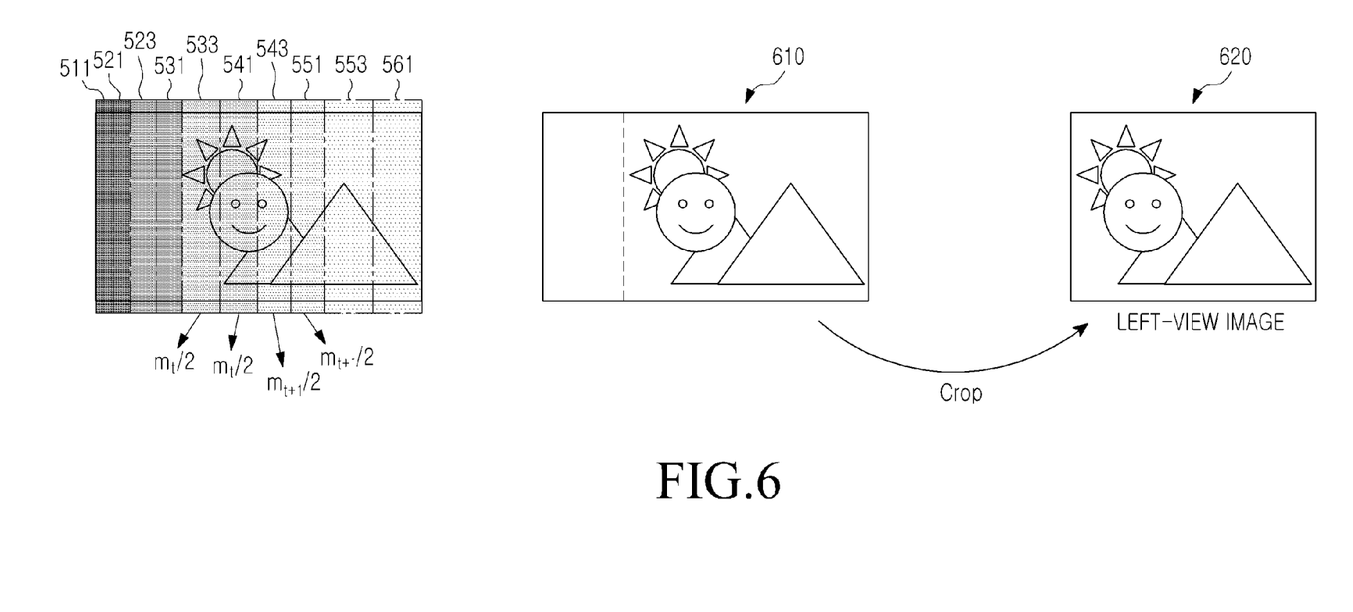
FIG. 6 illustrates a left-view image of a panoramic image generated by combining regions of FIG. 5, according to an embodiment of the present invention.
Figure 7:
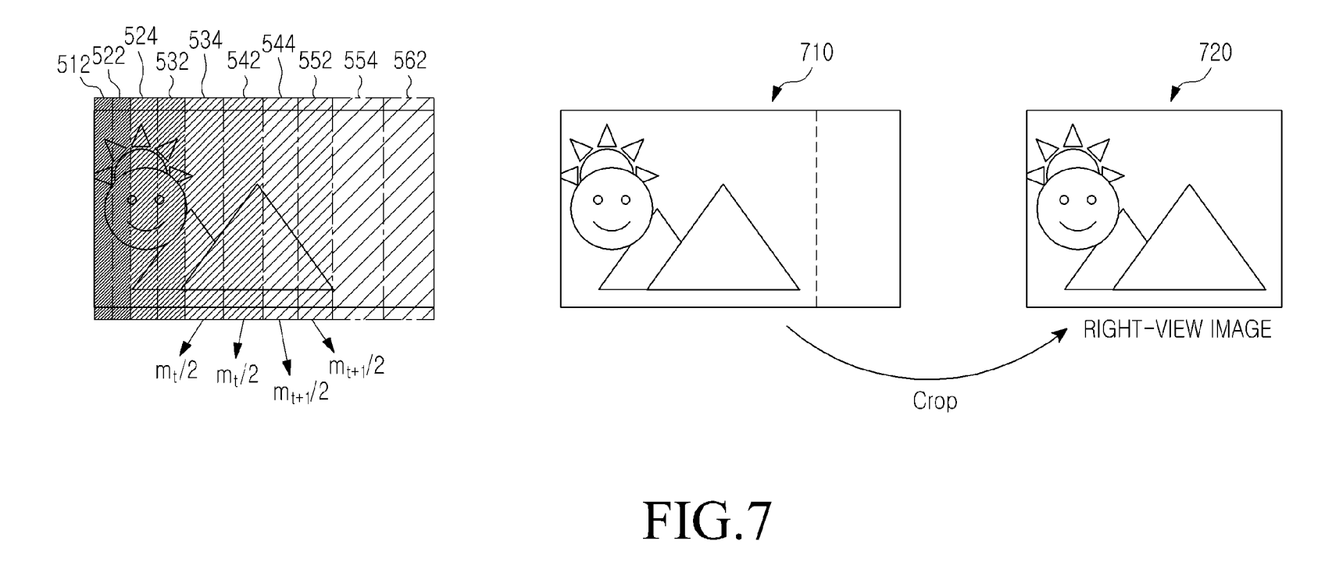
FIG. 7 illustrates a right-view image of a panoramic image generated by combining regions of FIG. 5, according to an embodiment of the present invention.

FIG. 6 illustrates a left image of a panoramic image generated by combining regions of FIG. 5, and FIG. 7 illustrates a right image of a panoramic image generated by combining regions of FIG. 5.

Referring to FIG. 5, the region detector 153 sets a first reference line 501 of the first image 510 for a left-view image and a second reference line 505 of the first image 501 for a right-view image. The first reference line 501 and the second reference line 505 are set identically for the second through sixth images 520 through 560.

The image detector 153 checks a movement distance $m_t$ between the first reference line 501 of the first image 510 and the first reference line 501 of the second image 520, and halves the movement distance $m_t$. The region detector 153 sets a region, which is located to the right from the first reference line 501 of the first image 510 and extends the halved movement distance $m_t/2$ from the first reference line 501, as a first region 511 of a panoramic image, and sets a region, which is located to the left from the first reference line 501 of the second image 520 and extends the halved movement distance $m_t/2$ from the first reference line 501, as a third region 521 of the panoramic image.

The region detector 153 also sets a region, which is located to the right from the second reference line 505 of the first image 510 and extends the halved movement distance $m_t/2$ from the second reference line 505, as a second region 512 of the panoramic image, and sets a region, which is located to the left from the second reference line 505 of the second image 520 and extends the halved movement distance $m_r/2$ from the second reference line 505, as a fourth region 522 of the panoramic image.

The region detector 153 provides the first region 511 and the third region 521 as regions for the left-view image of the panoramic image to the panoramic image generator 154, and provides the second region 512 and the fourth region 522 as regions for the left-view image of the panoramic image to the panoramic image generator 154.

In the same manner as described above, the region detector 153 also provides a fifth region 523 of the second image 520, a seventh region 531 and a ninth region 533 of the third image 530, an eleventh region 541 and a thirteenth region 543 of the fourth image 540, a fifteenth region 551 and a seventh region 553 of the fifth image 550, and a ninth image 561 of the sixth image 560 as regions for the left-view image of the panoramic image to the panoramic image generator 154, and provides a sixth region 524 of the third image 520, an eight region 532 and a tenth region 534 of the third image 530, a twelfth region 542 and a fourteenth region 544 of the fourth region 540, a sixteenth region 522 and an eighteenth region 554 of the fifth image 550, and a twentieth region 562 of the sixth image 560 as regions for the right-view image of the panoramic image to the panoramic image generator 154.

The panoramic image generator 154 arranges the regions for the left-view image and the regions for the right-view image based on a direction of the MV, thereby generating the left-view image and the right-view image of the panoramic image.

More specifically, as illustrated in FIG. 6, the panoramic image generator 154 sequentially arranges the first region 511, third region 521, the fifth region 523, the seventh region 531, the ninth region 533, the eleventh region 541, the thirteenth region 543, the fifteenth region 551, the seventeenth region 553, and the nineteenth 561 from the left to the right. The panoramic image generator 154 then generates an image 610 by combining the arranged regions, and crops some region of the generated image 610, thereby generating a left-view image 620 of the panoramic image.

As illustrated in FIG. 7, the panoramic image generator 154 sequentially arranges the second region 512, the fourth region 522, the sixth region 524, the eighth region 532, the tenth region 534, the twelfth region 542, the fourteenth region 544, the sixteenth region 552, the eighteenth region 554, and the twentieth region 562 from the left to the right. The panoramic image generator 154 then generates an image 710 by combining the arranged regions, and crops some region of the generated image 710, thereby generating a right-view image 720 of the panoramic image.

Figure 8:
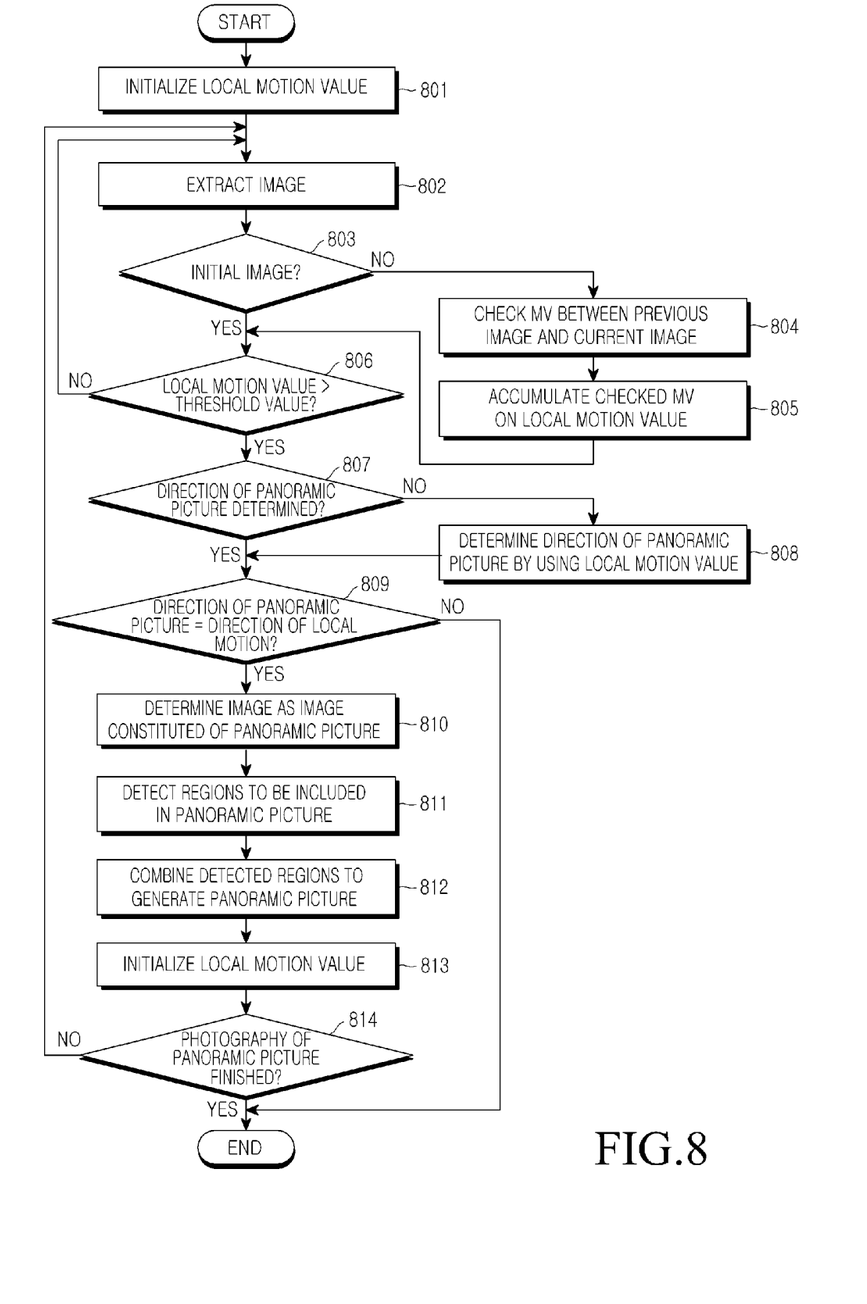
FIG. 8 is a flowchart illustrating a method for photographing a panoramic image according to an embodiment of the present invention.

FIG. 8 is a flowchart illustrating a method for photographing a panoramic image according to an embodiment of the present invention.

Referring to FIG. 8, a user selects a panoramic image photographing mode menu from among menu items of a portable terminal, e.g., from among sub menus of a camera photographing menu, and inputs a key for photographing a panoramic image, thereby starting photographing of the panoramic image.

Once photographing of the panoramic image starts, a local motion value for checking a movement distance of each image is initialized in step 801.

In step 802, an image input to a photographing apparatus is input in real-time at predetermined units of time (e.g., every 1/30 seconds) from the photographing apparatus and is stored in a buffer. That is, images input to the photographing apparatus are input like a moving image and the images (frames) included in the moving image are stored in a memory.

The image is used to check a camera's movement, and may be different from an image included in the panoramic image. Thus, when the image is used only to check camera's movement, a resolution of the image would be sufficient as long as it allows camera's movement to be checked. Consequently, step 802 of extracting an image may further include generating a low-resolution image for the image input to the photographing apparatus.

When the input image is an initial image, an MV cannot be checked because a previous image does not exist. Thus, in step 803, it is checked if the extracted image is an initial image. If the extracted image is an initial image, in step 806, to determine whether an input image has moved the predetermined distance, it is determined whether the local motion value reaches a predetermined threshold value. If the local motion value reaches the predetermined threshold value in step 806, in step 807, it is checked if the direction of the panoramic image has been determined. However, if the local motion value does not reach the predetermined threshold value in step 806, it is determined that the input image has not moved the predetermined distance and thus the process goes back to step 802.

In step 802, the initial image is stored as a previous image. Thereafter, in step 802 again, the extracted image is stored as a current image.

If the extracted image is not an initial image in step 803, an MV between the previous image and the current image is checked in step 804.

More specifically, in step 804, an MV between the current image of a low resolution and the previous image is estimated. For example, the MV may be estimated using an average value of an optical flow or block-matching.

Because the MV checked using the low-resolution image has a value different from an MV of a high-resolution image, the MV checked using the low-resolution image is matched to the MV of the high-resolution image to check a size of an actual MV. Therefore, in step 804, the MV checked using the low-resolution image is applied to the high-resolution image to determine the MV in the high-resolution image.

All images input to the photographing apparatus may be used as images in the panoramic image, but there may be a plurality of images captured for the same scene according to a user's moving speed. Therefore, it is desirable to use images moving a predetermined distance among all the input images as images to be included in the panoramic image. Accordingly, in step 805, the MV checked in step 804 is accumulated on a local motion value to determine whether an input image has moved the predetermined distance.

When the local motion value reaches the predetermined threshold value in step 806, it is determined that the input image has moved the predetermined distance and the input image is determined as an image to be included in the panoramic image. However, the local motion value may be a value acquired by movement in a direction different from that of the panoramic image, and thus it is necessary to check if the direction of local motion is identical to that of the panoramic image.

Accordingly, in step 807, it is checked if the direction of the panoramic image has been determined. For example, the direction of the panoramic image may be checked from an accumulated value of an MV. That is, once photographing of the panoramic image starts, a global motion value for setting the direction of the panoramic image is initialized and the local motion value of an image set to be included in the panoramic image is accumulatively added to the global motion value. When the global motion value reaches a predetermined threshold value, it may be determined that the direction of the panoramic image has been set.

If the global motion value reaches a predetermined threshold value and thus the direction of the panoramic image has already been set in step 807, in step 809, it is checked if the direction of local motion is identical to the direction of the panoramic image. If the direction of local motion is identical to the direction of the panoramic image, in step 810, it is determined that the image input to the photographing apparatus is moved by the predetermined distance in the direction of the panoramic image, and the input image will be included in the panoramic image.

However, if the direction of local motion is not identical to the direction of the panoramic image in step 809, photographing of the panoramic image is finished.

When the global motion value does not reach the predetermined threshold value and thus the direction of the panoramic image has not yet been determined in step 807, the direction of the panoramic image is determined in step 808 by using the local motion value detected in step 805.

In step 811, regions to be included in the panoramic image are detected from the image. In step 812, the detected regions are combined to generate the panoramic image. The local motion value is initialized in step 813, and in step 814, it is determined whether photographing of the panoramic image is finished. If photographing is not finished, the process goes back to step 802. Herein, the finish of photographing may be determined based on user's key input for finishing photographing the panoramic image or may be determined.

With reference to FIGS. 3A and 3B, steps 811 and 812 will be described in more detail.

Referring to FIG. 3A where the camera moves from the left to the right, in step 811, to detect regions to be included in the panoramic image, a reference line of an image (e.g., a horizontal or vertical central line of the image) is set. That is, the first central line 111 is set as the reference line of the first image 110, and the second central line 121 is set as the reference line of the second image 120. When the first image 110 is an initial image of the panoramic image, a left region with respect to the first central line 111 in the first image 110 is set as the first region 113 of the panoramic image. Based on the local motion value, the movement distance $m_t$ between the first central line 111 and the second central line 121 is checked and is then halved. A region, which is located to the right from the first central line 111 and extends the halved movement distance $m_t/2$ from the first central line 111, is set as the second region 115 of the panoramic image. A region, which is located to the left from the second central line 121 and extends the halved movement distance $m_t/2$ from the second central line 121, is set as the third region 123 of the panoramic image.

After the reference line of the third image 130 is set as the third central line 131, the movement distance $m_{t+1}$ between the second central line 121 and the third central line 131 is checked and then is halved. Like when the second region 115 and the third region 130 of the panoramic image are set, a region, which is located to the right from the second central line 121 and extends the halved movement distance $m_{t+1}$ from the second central line 121, is set as the fourth region 125 of the panoramic image, and a region, which is located to the left from the third central line 131 and extends the halved movement distance $m_{t+1}$ from the third central line 131, is set as the fifth region 133 of the panoramic image.

When the third image 130 is a final image of the panoramic image, a left region with respect to the third central line 131 in the third image 130 is set as the sixth region 135 of the panoramic image.

In step 812, the first through sixth regions 113, 115, 123, 125, 133, and 135 are sequentially provided, and based on the direction of the MV, they are sequentially arranged from the left to the right, thereby generating a horizontal panoramic image (140 of FIG. 3B). Because regions included in the panoramic image have been detected from a plurality of different images, image distortion may occur at boundaries between the detected regions, i.e., the first boundary 141 between the second region 115 and the third region 123 and the second boundary 143 between the fourth region 125 and the fifth region 133. To remove image distortion, image processing, such as blending, may be performed on a boundary between regions detected from different images.

According to the method for photographing the panoramic image, the panoramic image may be generated as a 3D image including a left-view image and a right-view image. The method for generating the panoramic image as a 3D image is identical to the above-described method for photographing the panoramic image, except for detailed operations in step 811 of detecting regions to be included in the panoramic image and step 812 of combining the detected regions.

In step 811, to generate the panoramic image as a 3D image, two reference lines for generating the left-view image and the right-view image are set in an input image, and predetermined regions are detected from the two reference lines. Thus, in step 811, two regions for generating the left-view image and the right-view image are generated from the single image. In step 812, the regions are arranged and combined to generate the left-view image and the right-view image for the panoramic image.

With reference to FIGS. 5 through 7, a detailed description will be made of a process of generating a panoramic image as a 3D image when a camera moves from the left to the right.

In step 811, the first reference line 501 of the first image 510 for the left-view image and the second reference line 505 of the first image 510 for the right-view image are set. The first reference line 501 and the second reference line 505 are set identically for the second through sixth images 520 through 560.

In step 811, the movement distance $m_t$ between the first reference line 501 of the first image 510 and the first reference line 501 of the second image 520 is checked, and the movement distance $m_t$ is halved. A region, which is located to the right from the first reference line 501 of the first image 510 and extends the halved movement distance $m_t/2$ from the first reference line 501, is set as the first region 511 of the panoramic image, and a region, which is located to the left from the first reference line 501 of the second image 520 and extends the halved movement distance $m_t/2$ from the first reference line 501, is set as the third region 521 of the panoramic image.

At the same time, a region, which is located to the right from the second reference line 505 of the first image 510 and extends the halved movement distance $m_t/2$ from the second reference line 505, is set as the second region 512 of the panoramic image, and a region, which is located to the left from the second reference line 505 of the second image 520 and extends the halved movement distance $m_t/2$ from the second reference line 505, is set as the fourth region 522 of the panoramic image.

In step 811, the first region 511 and the third region 521 are detected and provided as regions for the left-view image of the panoramic image, and the second region 512 and the fourth region 522 are detected as regions for the left-view image of the panoramic image.

In the same manner as described above, the fifth region 523 of the second image 520, the seventh region 531 and the ninth region 533 of the third image 530, the eleventh region 541 and the thirteenth region 543 of the fourth image 540, the fifteenth region 551 and the seventh region 553 of the fifth image 550, and the ninth image 561 of the sixth image 560 are detected as regions for the left-view image of the panoramic image, and the sixth region 524 of the third image 520, the eight region 532 and the tenth region 534 of the third image 530, the twelfth region 542 and the fourteenth region 544 of the fourth region 540, the sixteenth region 522 and the eighteenth region 554 of the fifth image 550, and the twentieth region 562 of the sixth image 560 are detected as regions for the right-view image of the panoramic image.

In step 812, the regions for the left-view image and the regions for the right-view image are arranged based on a direction of the MV, thereby generating the left-view image and the right-view image of the panoramic image. That is, as illustrated in FIG. 6, the first region 511, third region 521, the fifth region 523, the seventh region 531, the ninth region 533, the eleventh region 541, the thirteenth region 543, the fifteenth region 551, the seventeenth region 553, and the nineteenth 561 are arranged sequentially from the left to the right. The image 610 is generated by combining the arranged regions, and some region of the generated image 610 is cropped, thereby generating the left-view image 620 of the panoramic image.

As illustrated in FIG. 7, the second region 512, the fourth region 522, the sixth region 524, the eighth region 532, the tenth region 534, the twelfth region 542, the fourteenth region 544, the sixteenth region 552, the eighteenth region 554, and the twentieth region 562 are arranged sequentially from the left to the right. The image 710 is generated by combining the arranged regions, and some region of the generated image 710 is cropped, thereby generating the right-view image 720 of the panoramic image.

A method for photographing a panoramic image according to an embodiment of the present invention implements the panoramic image by using a central region of an image having small distortion in terms of perspective, thereby relatively simply minimizing distortion caused by perspective in the panoramic image without projecting an input image onto a virtual plane having the same local length.

Further, the panoramic image is generated by combining regions provided around the central line of the image. To generate the panoramic image by combining the regions provided around the central line of the image, a UI displaying regions included in the panoramic image may be provided to the user.

To this end, a panoramic image photographing method according to an embodiment of the present invention may provide a UI including the window displaying regions included in the panoramic image and the direction indicator indicating the direction of the panoramic image in step 807 of checking if the direction of the panoramic image has been determined, step 808 of determining the direction of the panoramic image, step 809 of checking if the direction of local motion is identical to the direction of the panoramic image, step 810 of determining the image, and step 811 of detecting regions to be included in the panoramic image.

Although in an embodiment of the present invention, a resolution of an image used to check camera's movement and a resolution of an image included in a panoramic image are set differently. A low-resolution image used to check camera's movement is also generated. In addition, the MV is checked using the low-resolution image, and the MV checked using the low-resolution image is matched to an MV of a high-resolution image to check a size of an actual MV. However, the present invention is not limited to the above examples.

For instance, the resolution of the image used to check the MV and the resolution of the image included in the panoramic image may be set identically. Without generating the low-resolution image used to check camera's movement, the size of the MV may be checked from the captured image. That is, both the image used to check the MV and the image included in the panoramic image may have a low resolution or a high resolution.

When the captured image is the same as the image included the panoramic image, the MV may be checked using the captured image.

As described above, a panoramic image photographing method and apparatus according to the present invention can generate more accurate panoramic images by estimating camera movement without applying a projection to an image input to the camera.

Further, camera movement may be more accurately estimated without additionally including a separate device or hardware.

Furthermore, a user can automatically photograph the panoramic image merely by moving the photographing apparatus toward an object, such that the user can more easily acquire the panoramic image.

In addition, the panoramic image can be checked in real time without being post-processed.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for photographing a panoramic image in a portable terminal, the method comprising the steps of:
    detecting Motion Vectors (MVs) of a plurality of images captured through a photographing unit;
    selecting a first region to be included in a left-view image and a second region to be included in a right-view image, from each of the plurality of images, based on the MVs;
    generating the left-view image including each of the selected first regions;
    generating the right-view image including each of the selected second regions; and
    generating a three-dimensional (3D) panoramic image including the left-view image and the right-view image,
    wherein selecting the first region and the second region from each of the plurality of images comprises:
    selecting a previous first region from a previous image and a current first region from a current image, based on a first reference line; and
    selecting a previous second region from the previous image and a current second region from the current image, based on a second reference line, and
    wherein the first reference line and the second reference line are standards for generation of a 3D image.

2. The method of claim 1, wherein each of the previous first region and the current first region and each of the previous second region and the current second region are set based on a size of an MV between the previous image and the current image.

3. The method of claim 1, wherein detecting the MV for each of the plurality of images comprises:
generating a low-resolution image having a lower resolution than an image captured through the photographing unit;
estimating an MV of the low-resolution image; and
detecting the MV of the image captured through the photographing unit by applying the MV of the low-resolution image to the captured image.

4. The method of claim 1, further comprising:
generating a plurality of low-resolution images having a lower resolution than the plurality of images captured through the photographing unit,
wherein each of the first regions and each of the second regions are selected from the plurality of low-resolution images.

5. The method of claim 1, further comprising:
checking the MVs of the plurality of images;
accumulating the MVs of the plurality of images;
comparing the accumulated MVs with a predetermined value for selecting images; and
selecting the plurality of images to be included in the 3D panoramic image, when the accumulated MVs reaches the predetermined value.

6. The method of claim 1, further comprising selecting an image to be included in the panoramic image based on the MVs.

7. The method of claim 1, further comprising generating a User Interface (UI) including a reference line for displaying the first region and the second region to be included in the 3D panoramic image.

8. An apparatus for photographing a panoramic image in a portable terminal, the apparatus comprising:
a Motion Vector (MV) detector for detecting MVs of a plurality of images captured through a photographing unit;
a region detector for selecting regions of the plurality of images to be included in the panoramic image, based on the MVs, wherein the regions of the plurality of images are predetermined based on a reference line; and
a panoramic image generator for generating the panoramic image including the selected regions,
wherein the region detector selects predetermined regions from regions of a previous image and a current image based on the reference line including a first reference line and a second reference line, which are standards for generation of a three-dimensional (3D) image.

9. The apparatus of claim 8, wherein the region detector selects predetermined regions from regions of the previous image and the current image based on the reference line including a horizontal or vertical central line of a selected image.

10. The apparatus of claim 9, wherein the predetermined regions are set based on a size of an MV between the previous image and the current image.

11. The apparatus of claim 8, wherein the predetermined regions are set based on a size of an MV between the previous image and the current image.

12. The apparatus of claim 8, wherein the image detector checks the MVs of the plurality of images, accumulates the MVs of the plurality of images, compares the accumulated MVs with a predetermined value for selecting images, and selects the plurality of images to be included in the panoramic image, when the accumulated MVs reach the predetermined value.

13. The apparatus of claim 8, further comprising an image detector for selecting an image to be included in the panoramic image based on the MVs.

14. The apparatus of claim 8, further comprising a User Interface (UI) manager for generating a UI including the reference line for displaying the regions to be included in the panoramic image.

* * * * *